Patented Jan. 30, 1934

1,945,183

UNITED STATES PATENT OFFICE 1,945,183

MANUFACTURE OF ALKOXY DERIVATIVES OF PHOSPHOROUS ACID CHLORIDES

Erik Clemmensen, St. Louis, Mo., assignor, by mesne assignments, to Monsanto Chemical Company, a corporation of Delaware No Drawing. Application December 24, 1931
Serial No. 583,141

3 Claims. (Cl. 260—98)

This invention relates to the manufacture of alkoxy derivatives of acid chlorides according to which an acid chloride may be caused to react practically quantitatively with an aliphatic alcohol to form the corresponding alkoxy derivative. Thus, for example, by means of the present invention one may obtain practically quantitative yields of methoxy phosphorus-oxydichloride by causing phosphorus oxychloride to react with an equal molar quantity of methyl alcohol.

It is known that if an acid chloride, as, for example, phosphorus oxychloride, is heated with methyl alcohol one obtains a mixture consisting of partially hydrated phosphorus oxychloride, hydrogen chloride, methyl chloride and various other products. It is likewise known that if diethyl phthalate is caused to react with an acid chloride, such, for example, as phthalyl chloride, one obtains ethyl chloride and phthalic anhydride.

It has been proposed to manufacture monoalkoxy phosphorus oxydichloride by mixing the corresponding alkyl alcohol with phosphorus oxychloride and subsequently expelling hydrogen chloride by bubbling carbon dioxide or some other dry inert gas through the mixture. This reaction does not proceed smoothly, however, and only a small yield of the methoxy derivative is obtained. Moreover, the resulting reaction mixture cannot be purified readily without subjecting the same to distillation, which in turn results in decomposition, one of the products formed being methyl chloride. On the other hand, without distilling this reaction mixture, hydrogen chloride is evolved over a long period of time and the material is otherwise unsatisfactory for commercial use.

I have now found that one may control the reaction accurately and obtain quantitative yields of an alkoxy derivative of an acid chloride, which may be distilled without decomposition, by mixing an alcohol with an acid chloride and effecting the elimination of the hydrogen chloride by reducing the pressures. In this way the reaction proceeds smoothly and quantitatively, in many cases at ordinary temperatures and with the absorption of heat.

The following examples will serve to illustrate the application of principles of the present invention:

*Example 1.*—Methoxy phosphorus oxydichloride, having the structural formula

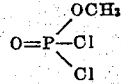

may be made by adding slowly, and preferably with agitation, 1 molar proportion of anhydrous methanol to an equal molar proportion of phosphorus oxychloride, the temperature of the mixture being maintained at approximately 0° C. After all of the methanol has been added, the pressure is reduced to approximately 25 mm., whereby a vigorous evolution of hydrogen chloride ensues. The temperature of the reaction mixture, even when a relatively large container surface is exposed to the atmosphere, drops to approximately —10° C. After the evolution of the hydrogen chloride has subsided, the mixture is heated slowly while maintaining reduced pressure conditions until all the product distills. A practically quantitative yield of the methoxy phosphorus oxydichloride is thus obtained.

*Example 2.*—Dimethoxy phosphorus oxymonochloride, having the formula:

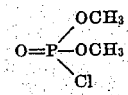

is prepared in a manner analogous to that described in Example 1, with the exception that 2 molar proportions of anhydrous methanol are employed.

*Example 3.*—Methoxy phosphorus sulfodichloride having the structural formula:

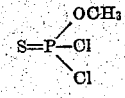

is prepared in the manner described in Example 1 by substituting phosphorus sulfochloride, having the structural formula

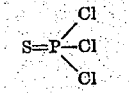

for the phosphorus oxychloride employed in Example 1. The evolution of the hydrogen chloride may be facilitated advantageously by refluxing the reaction mixture.

*Example 4.*—Mono normal butoxy phosphorus oxydichloride, having the formula

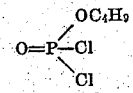

is made advantageously by substituting normal butyl alcohol which previously has been dehydrated, for the methyl alcohol and otherwise proceeding as set forth in Example 1.

*Example 5.*—Mono-methoxy-ethoxy phosphorus oxydichloride, having the formula

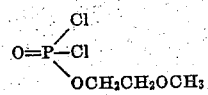

is made by substituting an equal molar proportion of the mono-methyl ether of ethylene glycol for methyl alcohol provided for in Example 1, and otherwise proceeding substantially as described in Example 1.

Various alkoxy derivatives may be prepared in a manner analogous to those set forth hereinabove. Thus, for example, one may make the corresponding mono or di-substituted ethyl, normal propyl, isopropyl, secondary butyl, normal amyl, as well as other derivatives, by substituting the corresponding alcohol for the methyl alcohol provided for in Example 1 or 2, respectively. Mono or di-substituted alkyl derivatives may be formed by introducing in place of the mono-methyl ether of ethylene glycol, provided for in Example 5, other ether alcohol compositions, such as, ethyl ether of ethylene glycol, butyl ether of ethylene glycol, etc. Similarly, aryl substituted alcohols, such as, benzyl alcohol, may be substituted for the methyl alcohol in Examples 1 and 2.

From the foregoing description of my invention, it should be apparent that the invention is not limited to the specific examples set forth or to the precise pressure, temperature or other conditions indicated in the examples, but it contemplates broadly the preparation of derivatives of acid chlorides wherein a part of the chlorine atoms of the acid chloride are replaced by substituted or unsubstituted alkoxyl radicals by causing the corresponding substituted or unsubstituted alcohol to react with an acid chloride under reduced pressure conditions whereby the evolution of the hydrogen chloride is complete at a relatively low temperature, thereby eliminating to a large extent the by-product formation manifest at relatively high temperatures.

What I claim is:

1. The method which consists in reacting under reduced pressure a molar proportion of a material having the following structural formula

where X represents a sulfur atom, with less than three molar proportions of an alcohol selected from a group consisting of the following: methyl, ethyl, propyl and butyl.

2. The process that comprises reacting a molar proportion of a compound of the formula

where X is sulfur, with less than three molar proportions of an aliphatic alcohol under reduced pressure.

3. The process that comprises reacting a molar proportion of a compound of the formula

where X is sulfur, with less than three molar quantities of methanol under reduced pressure.

ERIK CLEMMENSEN.